United States Patent [19]

Wang et al.

[11] Patent Number: 6,104,048
[45] Date of Patent: Aug. 15, 2000

[54] ELECTROSTATIC DISCHARGE PROTECTION FOR MAGNETO-RESISTIVE HEADS

[75] Inventors: Wenwei Wang, Fremont; Larry Trung Vo, San Jose, both of Calif.

[73] Assignee: Iomega Corporation, Roy, Utah

[21] Appl. No.: 09/345,038

[22] Filed: Jun. 30, 1999

[51] Int. Cl.⁷ .................................................. H01L 29/80
[52] U.S. Cl. ........................... 257/272; 257/355; 361/91; 369/135; 369/145
[58] Field of Search .................................. 257/173, 272, 257/355; 369/135, 145; 361/91

[56] References Cited

U.S. PATENT DOCUMENTS

| | | | |
|---|---|---|---|
| 5,446,320 | 8/1995 | Scharnberg et al. | 307/100 |
| 5,644,444 | 7/1997 | Braithwaite et al. | 360/60 |
| 5,754,369 | 5/1998 | Balakrishman | 360/104 |
| 5,872,679 | 2/1999 | Boigenzahn et al. | 360/97.01 |
| 5,949,602 | 9/1999 | Ishioka et al. | 360/75 |
| 5,949,831 | 9/1999 | Coker et al. | 375/341 |
| 5,953,173 | 9/1999 | Klaassen et al. | 360/66 |
| 5,955,176 | 9/1999 | Erpelding et al. | 428/209 |
| 6,002,549 | 12/1999 | Berman et al. | 360/104 |
| 6,044,056 | 3/2000 | Walch et al. | 369/119 |

*Primary Examiner*—Ngân V. Ngô
*Attorney, Agent, or Firm*—Woodcock Washburn Kurtz MacKiewicz & Norris LLP

[57] ABSTRACT

An electrostatic protection network is disclosed that may be employed in a disk drive having a magneto-resistive read element. The network comprises a ground; and an array that block a signal current flow between the read element and the ground while a signal voltage is below a predetermined value and conducts the signal current from the read element to the ground while the signal voltage is above the predetermined value. The array is formed of a N-channel and P-channel junction field effect transistors. Thus, electrostatic discharge events are dissipated through the network to diminish damage to the read element during an ESD event.

17 Claims, 13 Drawing Sheets

ELECTROSTATIC DISCHARGE PROTECTION FOR MAGNETO-RESISTIVE HEADS

FIELD OF THE INVENTION

The invention relates to electronic circuits for drives that store and retrieve data, and more particularly, to electronic circuits that protect drive components from electrostatic discharge.

BACKGROUND

Conventional disk drive systems may include a spindle motor, a recording medium mountable on the spindle motor, one or more heads, and a rotary actuator system. The storage medium encompasses rigid magnetic disks, flexible magnetic disks, magnetic tape, and magneto-optical disks. The magnetic tape and disks are often housed in a removable cartridge that is insertable into an aperture in the disk drive.

Because of the trend toward higher areal density of information on the storage media, flying height of the heads over the media often is minimized. Magneto-resistive ("MR") heads and giant magneto-resistive ("GMR") are often employed with media having relatively high areal density. Referring to FIG. 8A (Prior Art), an MR head is shown schematically. MR head 28' includes a magneto-resistive read sensor or read head 60 and a separate inductive write element or write head 62. Read head 60 includes an MR sensor 66, which is formed of magneto-resistive material, between shields 64a and 64b. FIG. 8B (Prior Art) illustrates terminals 80a and 80b, through which current I passes. FIG. 8C (Prior Art) illustrates a floating head 28' that includes terminals 80a and 80b, which are connected to a preamplifier 30', which is coupled to and a read channel 34'.

Referring to FIG. 9 to illustrate a conventional operation during which data is retrieved from a drive 14' by a computer, a signal 69' is sent from the computer to drive 14' though a standard computer SCSI interface 48b that connects to a SCSI interface 48a of drive 14'. Signal 69' is transmitted through drive 14', and head 28' moves in response to signal 69' to the appropriate track on disk 18. head 28' transmits a head signal 70' to a register 36', which typically is part of the integrated circuit that includes preamplifier 30'. Within preamplifier 30', head signal 70' is amplified and attenuated by a circuit 33' to an appropriate level to produce an amplifier output signal 71'. Recording channel 34' receives and conditions amplifier output signal 71' to produce a data output signal 72' that is communicated to the computer via the SCSI interfaces 48a and 48b.

A conventional recording channel 34' may include an automatic gain control module to adjust the signal gain, a low pass filter to limit high frequency noise, an equalizer for slimming signal pulses so that interference among adjacent pulses is reduced, a peak detection circuit that differentiates peaks by converting the peaks into zero crossings and utilizes a comparator gate to generate pulses out of the zero-crossing detection circuit, a phase lock oscillator that monitors the embedded clock and reconstructs time interval, and a data decoder that detects the presence or absence of zero crossings within each window and converts the data into its original form. Recording channel 34' may be formed on a single chip or a chip set of two or three chips. The chip(s) of recording channel 34' may be disposed on a main printed circuit board 50, which is typically disposed below the base plate of the drive 14', although other locations are possible.

Within a disk drive, an electrostatic charge may build up by ambient particles rubbing together or rubbing on the media and drive components, by the head rubbing on the disk, by insertion of a removable cartridge that may have a latent charge, and similar phenomena. Discharge of the electrostatic charge may cause damage to the drive and disk, especially drives that employ MR heads or GMR heads, although virtually any head of a disk drive or a tape drive may be damaged by a discharge of static electricity.

A typical MR head may tolerate approximately 50 volts, while a typical GMR head may tolerate approximately 15 volts. Voltage that exceeds these limits may damage the heads, especially the magneto-resistive element 66, even if applied for a only short period.

An electrostatic discharge ("ESD") event may damage a magneto-resistive head in two ways. First, a relatively small ESD event (or a series of small ESD events) may result in magnetic degradation of the magneto-resistive element, which may be exacerbated by changes in the physical or magnetic properties of the head shell or shields. Magnetic degradation changes the resistance of the MR head and GMR head, on which the operation of the head and the associated recording channel depend. Specifically, head signal 70' may be altered by magnetic degradation of element 66, which may produce errors in data output signal 72'. Second, a relatively large ESD event may result in physical damage to the GMR or MR head 28, (especially the magneto-resistive element 66), preamplifier 30', recording channel 34', the arm electronics module, disk surface 18, and other components.

An ESD event may affect the data recording process, produce chronic errors in data recording, and catastrophic damage to the media and drive components. It is a goal of the present invention to protect a disk drive (especially magneto-resistive heads) and media from damage and interference from ESD events.

SUMMARY

A head system for a data storage drive is provided that includes a read transducer that is electrically coupled to recording channel components, a grounded terminal and an ungrounded terminal. The head system includes an electrostatic discharge protect system including an electrostatic discharge protect network and a network ground. The network ground is electrically coupled to the ungrounded terminal through the electrostatic discharge protect network. The protect network is substantially non-conductive between the network ground and the ungrounded terminal below a predetermined voltage and is conductive between the network ground and the ungrounded terminal below a predetermined voltage. The electrostatic discharge protect network changes from substantially non-conductive to conductive upon an electrostatic discharge event to conduct an electrostatic charge to the network ground. Preferably, the head system read transducer includes a stripe of magneto-resistive material, such as an MR or GMR head.

According to another embodiment of the present invention the read transducer is electrically coupled to recording channel components, and the head system includes a first ungrounded terminal and a ungrounded second terminal. The first electrostatic discharge protect system includes a first electrostatic discharge protect network and a first network ground. The first network ground is electrically coupled to the first terminal through the first electrostatic discharge protect network, and the first protect network is substantially non-conductive between the first network ground and the first terminal below a predetermined voltage and is conductive between the first network ground and the first terminal below the predetermined voltage. The system includes a second electrostatic discharge protect system including a second electrostatic discharge protect network and a second network ground. The second network ground is electrically coupled to the second terminal through the second electrostatic discharge protect network. The second protect network is substantially non-conductive between the second network ground and the second terminal below the predetermined voltage and is conductive between the second network ground and the second terminal below the predetermined voltage. The electrostatic discharge protect networks change from substantially non-conductive to conductive upon an electrostatic discharge event to conduct an electrostatic charge to the network ground. Preferably, the head system read transducer in each of the embodiments includes a stripe of magneto-resistive material, such as an MR or GMR head.

According to another aspect of the present invention, an electrostatic protection network is provided that may be employed in a disk drive having a magneto-resistive read element. The network comprises a ground; and a network that blocks a signal current flow between the read element and the ground while a signal voltage is below a predetermined value and conducts the signal current from the read element to the ground while the signal voltage is above the predetermined value. Thus, electrostatic discharge events are dissipated through the network to diminish damage to the read element.

The electrostatic protection network includes an array including a first row of plural N-channel junction field effect transistors connected in series and a second row of plural P-channel junction field effect transistors connected in series. Each one of the first row and the second row are connected between the read transducer and the network ground. The first row and the second row may be connected in parallel.

Figure 13A:
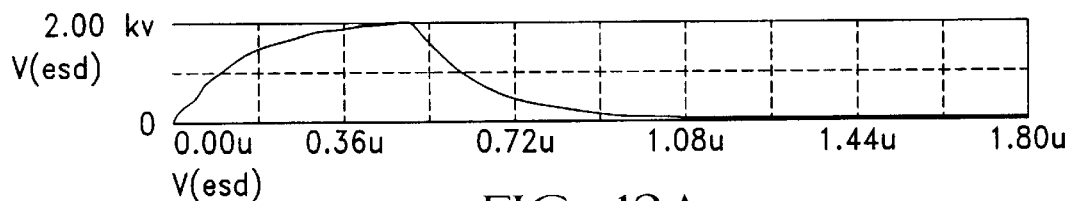
Figure 13B:
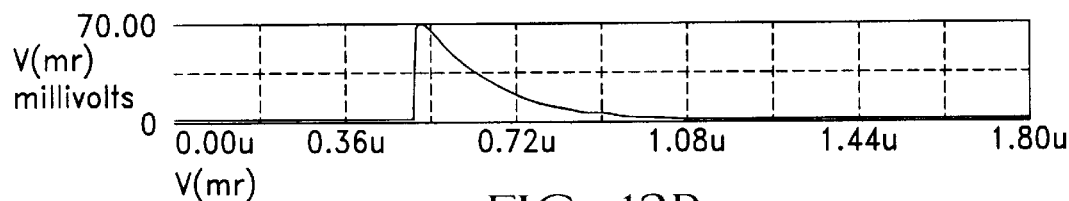
Figure 13C:
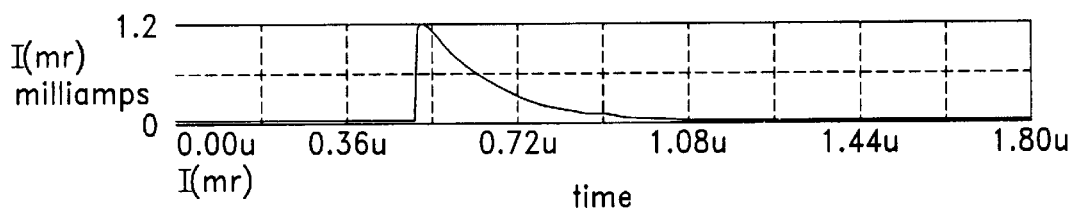
Figure 14A:
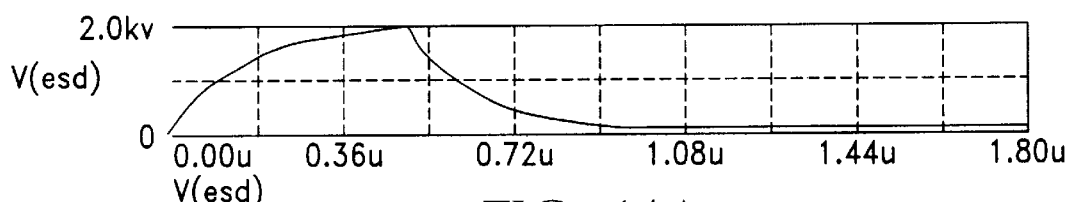
Figure 14B:
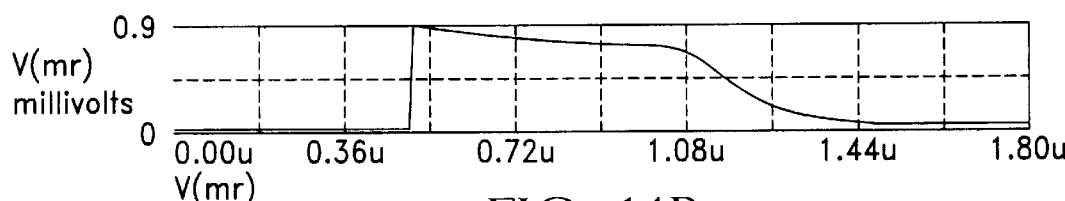
Figure 14C:
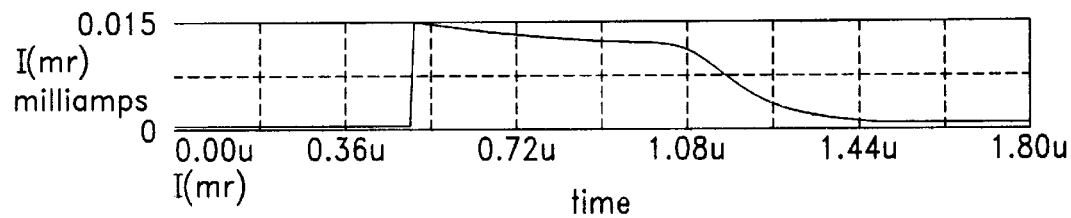

FIGS. respectively 12A, 12B, and 12C respectively illustrate simulation results with the ESD protection network installed to protect the head for an AMR head;

FIGS. 13A, 13B, and 13C respectively illustrate simulation results without the ESD protection network installed for a GMR head;

FIGS. 14A, 14B, and 14C respectively illustrate simulation results with the ESD protection network installed to protect the head for a GMR head.

DESCRIPTION OF A PREFERRED EMBODIMENT

Figure 6:
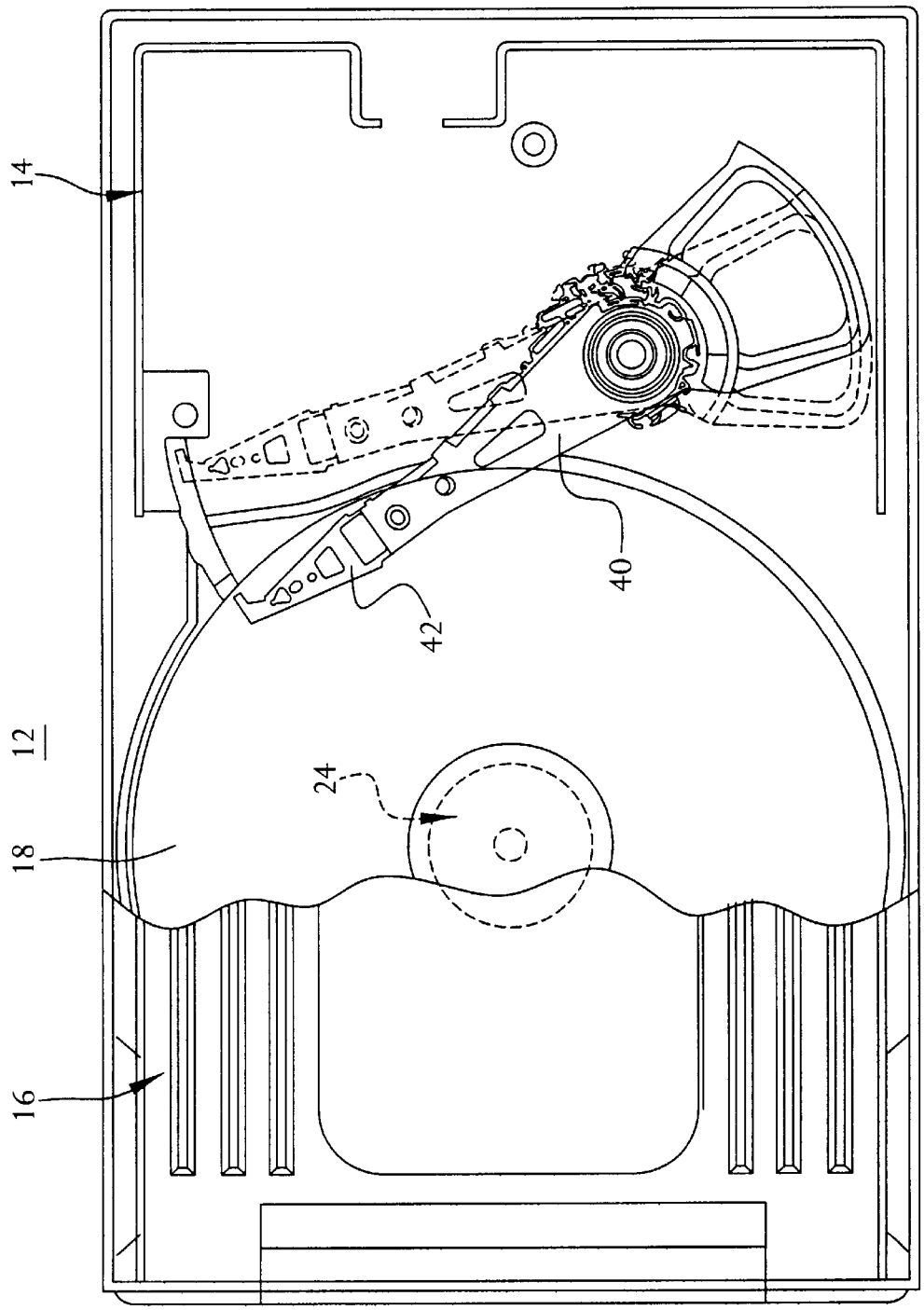
FIG. 6 is a view of an embodiment of the disk drive system that may employ the present invention, showing both the disk drive and a removable cartridge, and with some features removed for clarity.
Figure 7:
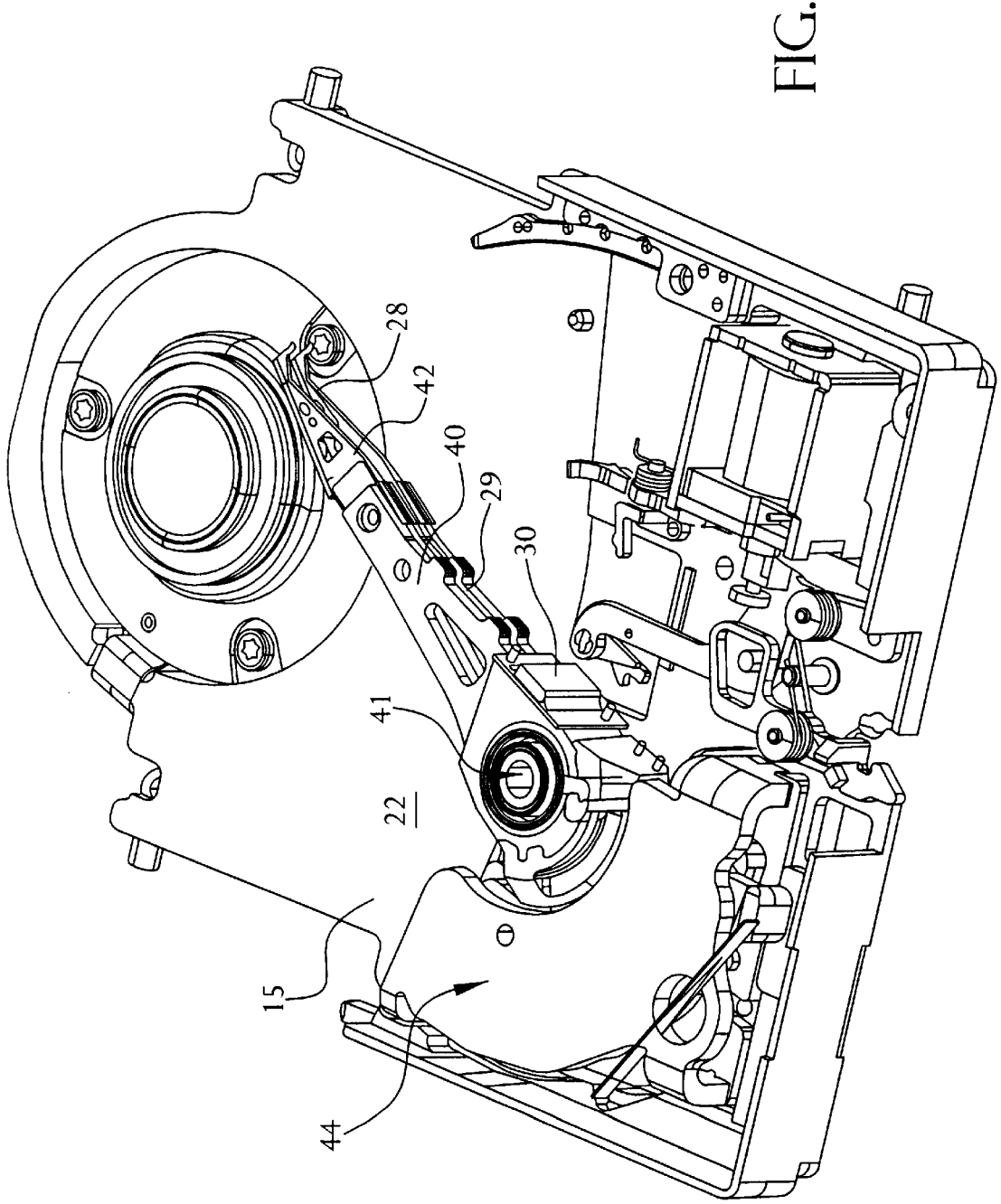
FIG. 7 is a perspective view of aspects of the disk drive.

Referring to FIGS. 6 and 7 to illustrate an example of a disk drive system to which the present invention may be employed, the disk drive system 12 includes a disk drive 14 and a removable cartridge recording medium 16, which houses a rotatable magnetic disk 18. Disk drive 14 includes an actuator system 22, a spindle motor 24, and a control system that includes a recording channel. The actuator system 22 includes a rotary actuator 26, head 28, a suspension arm 42, and a voice coil motor 44.

Rotary actuator 26 includes a structural arm 40 that pivots on pivot 41, which is fixed to a platform 14 of disk drive 14. The platform, shown in FIG. 7, of the exemplary embodiment is movable within the disk drive, as described in pending U.S. patent application Ser. No. 08/835,437, filed Apr. 9, 1997 (Attorney Docket Number IOM-9317), entitled "Shutterless Data Recording Cartridge and Drive for Using Same," which is assigned to the assignee of the present invention and incorporated herein in its entirety.

Voice coil motor 44 is disposed near an end of the rotary actuator 40, and drives actuator 26 to position head 28 over a selected position on the disk 18. Suspension arm 42 extends from structural arm 40. Head 28 is mounted near the distal end of suspension arm 42 on a gimbal assembly (not shown).

Figure 2:
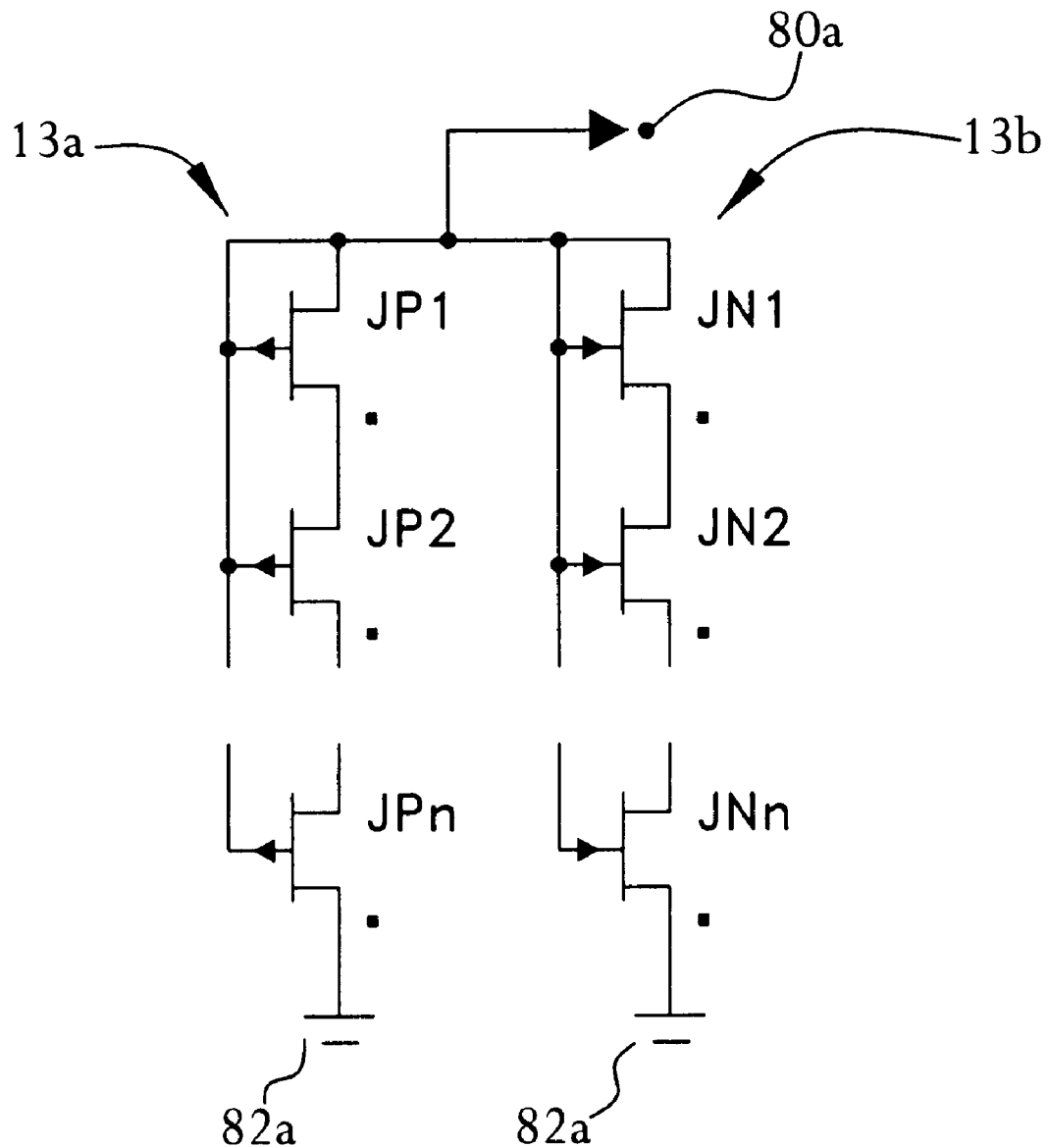
FIG. 2 is a schematic block diagram of an embodiment of the protective circuit shown schematically in FIGS. 1A and 1B.

A preamplifier 30, which is electrically connected to head 28 by leads 29, amplifies signals 70 from head 28. Preamplifier 30 may be included in an arm electronics module, and preferably is mounted on the side of the structural arm 40, as shown in FIG. 2. In addition to preamplifier 30, the arm electronics module may include circuits that switch head 28 between read and write operations, write drivers that switch currents to the head according to data input, and like functions. The configuration of the module will vary according to the particular design of the system, as will be understood by person familiar with such technology. The integrated circuit that includes preamplifier 30 may be mounted anywhere in the drive, including near the rotary actuator and connected by a flex circuit (not shown). It is desirable, however, to dispose preamplifier 30 close to head 28 to minimize noise interference. For clarity, recording channel 34 will be referred to herein as encompassing conventional recording channel functions, but excludes preamplifier 30 as defined herein.

Figure 1A:
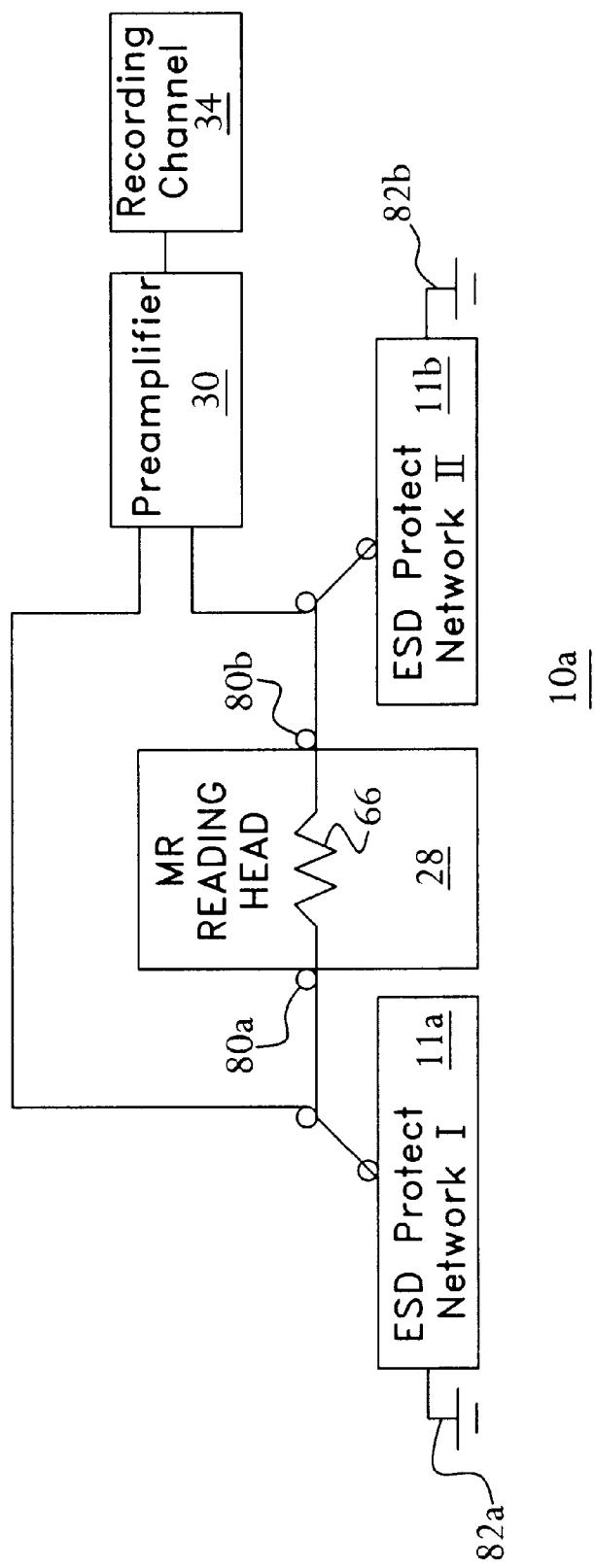
FIG. 1A is a schematic block diagram of a magneto-resistive recording head and protective circuit according to an embodiment of the present invention.

Referring to FIG. 1A to describe a first embodiment 10a the present invention, disk drive 14 includes a head system 10a that comprises head 28, a first electrostatic discharge protection network 11a, and a second electrostatic discharge protection network 11b. Head 28, which is preferably an MR head or a GMR head, includes a first terminal 80a and a second terminal 80b, which are coupled to opposing ends of sensor 66. Recording channel 34 and preamplifier 30 are coupled to head 28 via terminals 80a and 80b. Head 28, as shown in FIG. 1, has neither terminal 80a nor 80b connected to a ground, which is commonly referred to as a floating head configuration.

First ESD protection network 11a has an end coupled to first terminal 80a and another end coupled to a first network ground 82a. Second ESD protection network 11b an end coupled to second terminal 80b and another end coupled to a second network ground 82b. The term network ground encompasses a single ground, and separate grounds (as generally shown in the figures).

Figure 1B:
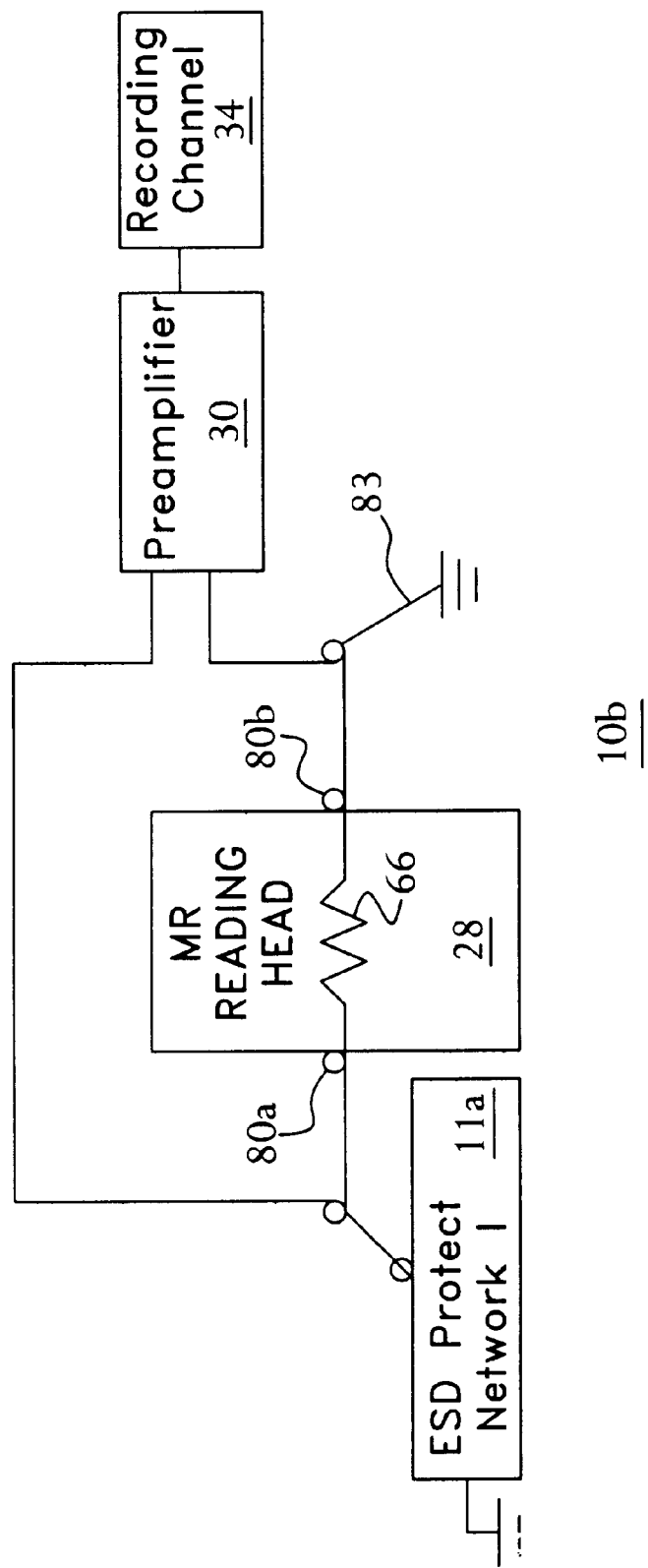
FIG. 1B is a schematic block diagram of another magneto-resistive recording head and protective circuit according to another embodiment of the present invention.

Referring to FIG. 1B, another embodiment 10b of the present invention includes recording head 28, preamplifier 30, and recording channel 34. A first ESD protection network 11a has an end coupled to first terminal 80a and another end coupled to network ground 82a. Terminal 80b of head 28 is connected to a head ground 83.

ESD protection networks 11a and 11b conceptually are gates that are substantially non-conductive up to a predetermined voltage. The predetermined voltage at which the ESD protection networks become conductive may be chosen to be greater than peak signal voltage (that is, the peak of head signal 70) during normal reading operations (usually a few millivolts) and much less than voltage created by an ESD event (often hundreds of volts). For example, the predetermined voltage below which networks 11a and 11b are not conductive may be approximately 900 mV (millivolts), although the particular value may depend upon the particular components, voltage tolerance of components, and like parameters. Networks 11a and 11b become conductive above the predetermined voltage.

FIG. 2 illustrates an ESD protection network 11a. For simplicity, network 11a is shown, although the diagram and discussion is equally applicable to ESP protection network 11b. ESD protection network 11a consists of junction field effect transistors, which will be referred to herein as JFETs. A row of N-JFETs JN1, JN2, . . . JNn, is used for positive ESD protection, while the row of P-JFETs JP1, JP2, . . . JPn for negative ESD protection. The N-channel and P-channel designations indicate the polarity of the majority charge carriers in the bar of semiconductor that connects the drain terminal to the source terminal.

ESD protection network 11a includes an array that preferably has both N-JFETs and P-JFETs. The P-JFETs preferably are arranged in a series 13a, and the N-JFETs preferably are arranged in a series 13b, as shown in FIG. 2. Series 13a is connected in parallel to series 13b. Preferably, fast response type JFETs are employed. The number of transistors, designated by reference numeral n for each N-JFETs and P-JFETs. used in each row 13a and 13b may depends on the design of MR head 28, or mainly the resistance of the MR stripe. Specifically, because employing a greater number of JFETs increases the threshold voltage, a greater number of transistors n may be employed with larger MR stripe resistance.

The cut-off voltage of N-JFETs determines the positive trigger threshold for the ESD protection network 11a, while the cut-off voltage of P-JFETs determines the negative trigger threshold. The positive threshold preferably is higher than the sum of the bias voltage and the positive peak signal voltage across the MR head 28 (for example, less than 400 mV), while the negative threshold only needs to be set higher than the negative peak signal voltage. For the simplicity and symmetry of the ESD protection network 11a, the negative threshold is designed to be equal to the positive threshold. For illustration, the positive and negative thresholds may be set to be 900 mV and −900 mV respectively.

In operation, the ESD protection network 11a is inactive when the voltage across MR head 28 is between the positive and negative thresholds. When a positive or negative ESD voltage strikes MR head 28, the ESD protection network 11a will wake up immediately to clamp the voltage across MR head 28 to the positive or negative threshold value.

Figure 3A:
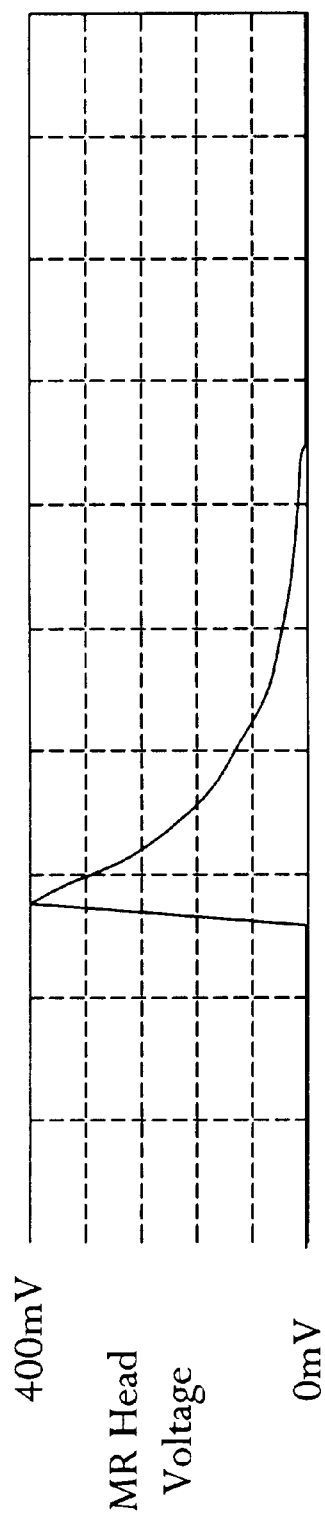
FIGS. 3A and 3B are graph illustrating exemplary head voltage and protective network current during operation of the MR head, the graphs of FIGS. 3A and 3B share a common abscissa.
Figure 3B:
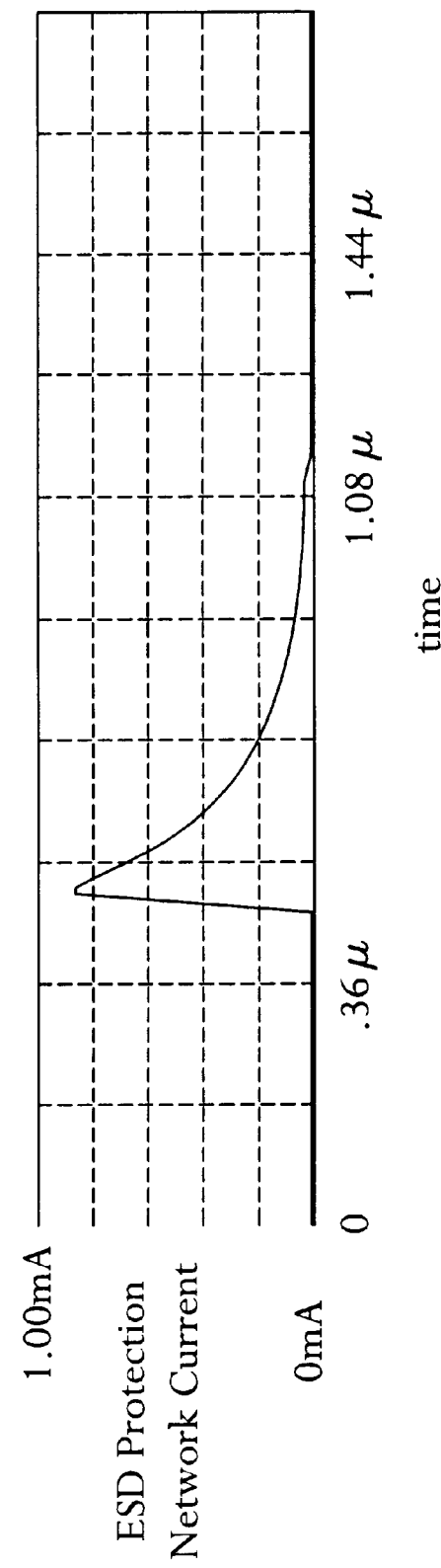

In order not to affect the normal operation of MR head 28 (that is, while network 11a is intended to be inactive because MR head 28 has not encountered an ESD event), the current following through ESD protection network 11a should be as small as possible (ideally to be zero) when ESD protection network 11a is inactive (that is, when network 11a is intended to be non-conductive). The network 11a is substantially non-conductive in its inactive state, although it includes a relatively small amount of current flow through network 11a, as illustrated more fully herein. Referring to FIGS. 3A and 3B to illustrate the normal operation of a system employing an MR stripe resistance of 60 Ω(ohms) and three transistors respectively used in each row of N-JFETs and P-JFETs, the current flowing through the ESD protection network 11a is less than 1 mA (milliamps) when the voltage across the MR head 28 is 400 mV (millivolts).

A method according to an aspect of the present invention is described concurrently with the function of embodiments 10a and 10b. During typical read functions, drive 14 positions head 28 at a desired track on disk 18. Sensor element 66 changes resistivity in response to encountering a magnetic field on disk 18. A signal voltage passing through head 28 is amplified and processed by preamplifier 30 and recording channel 34. Voltage across the MR stripe of head 28 is often within the range of 0.5 mV to 4 mV and preamplifier output is often 200 mV to 400 mV, although voltage ranges will vary according to the particular characteristics of the components and the drive.

Figure 4:
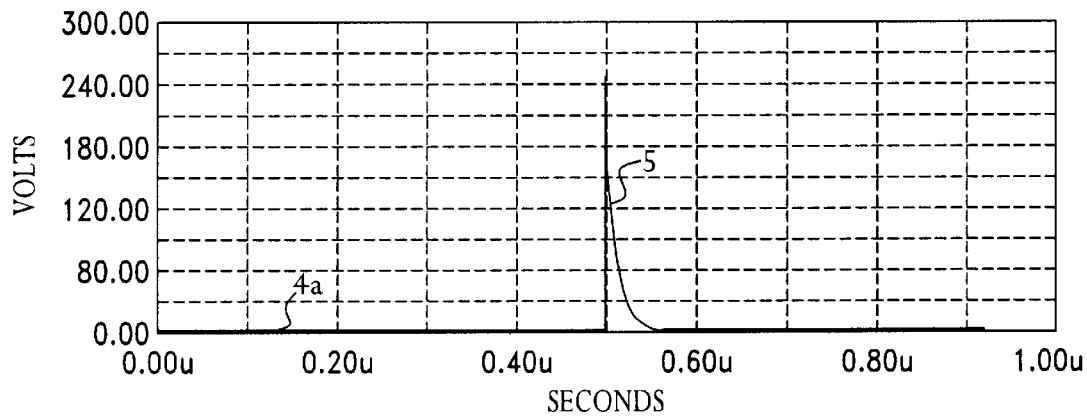
FIG. 4 is a diagram of a voltage versus time relationship for an exemplary magneto-resistive head undergoing an ESD event in the absence of the present invention.

Upon an ESD event, which includes discharge at any portion of drive 14 (especially at actuator 22 and head 28), the voltage at head 28 may be many times greater than normal signal voltage, and even greater than MR, GMR, or other heads can tolerate. For example, FIG. 4 shows the relationship of voltage versus time sensed at head 28. A signal voltage 4, which represents normal reading functions, has a magnitude of a few millivolts, and therefore appears very close to zero on the y-axis, which has units of volts. Head 28 performs normal reading functions from zero microseconds to 0.5 microseconds, at which time an electrostatic discharge events occur which subjects head 28 to approximately 260 volts at the peak of the voltage spike, as shown in curve 5.

Figure 8A:
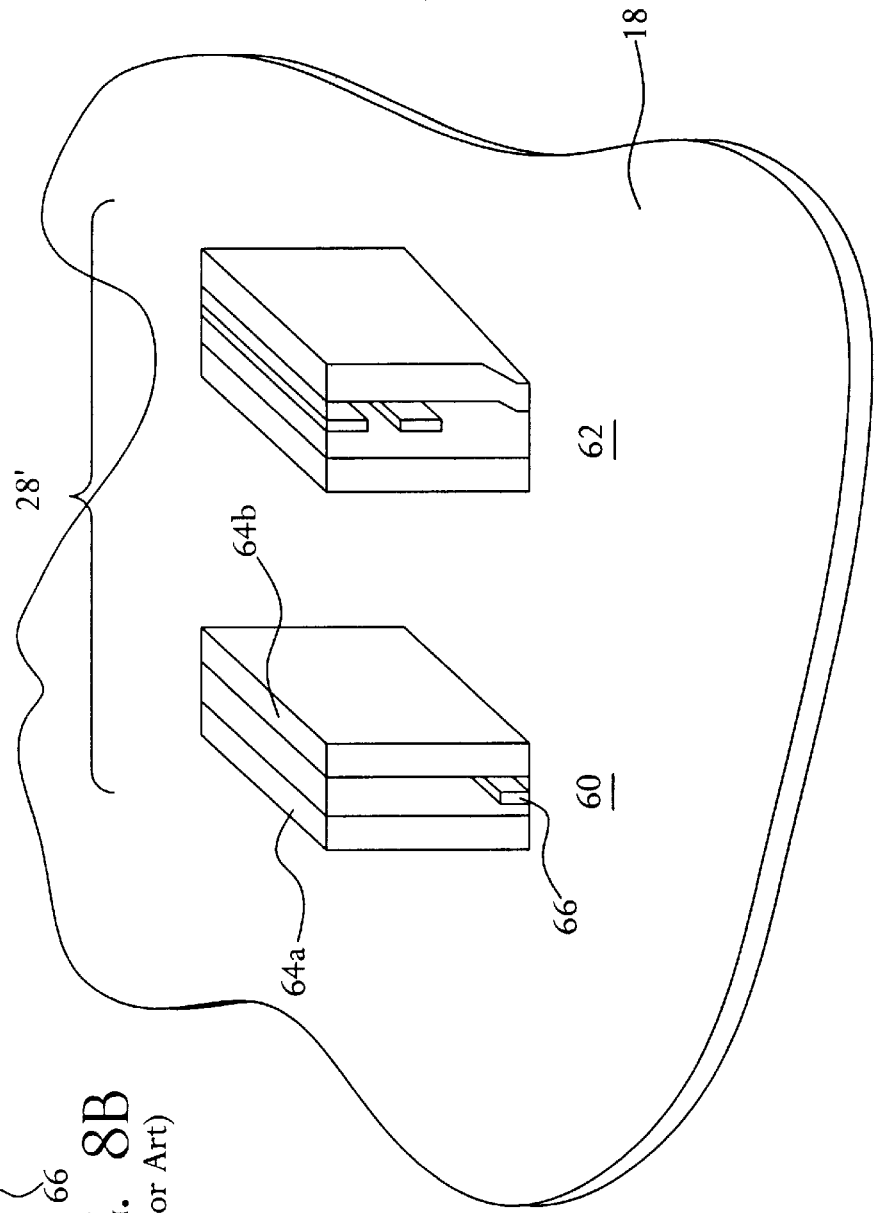
FIG. 8A (PRIOR ART) is a schematic perspective view of a feature of the disk drive.
Figure 8B:
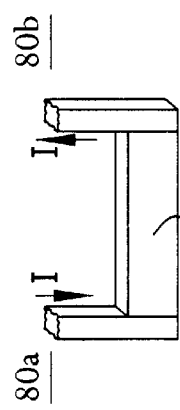
FIG. 8B (PRIOR ART) is a schematic perspective view of a portion of the feature of the disk drive of FIG. 8A.
Figure 8C:
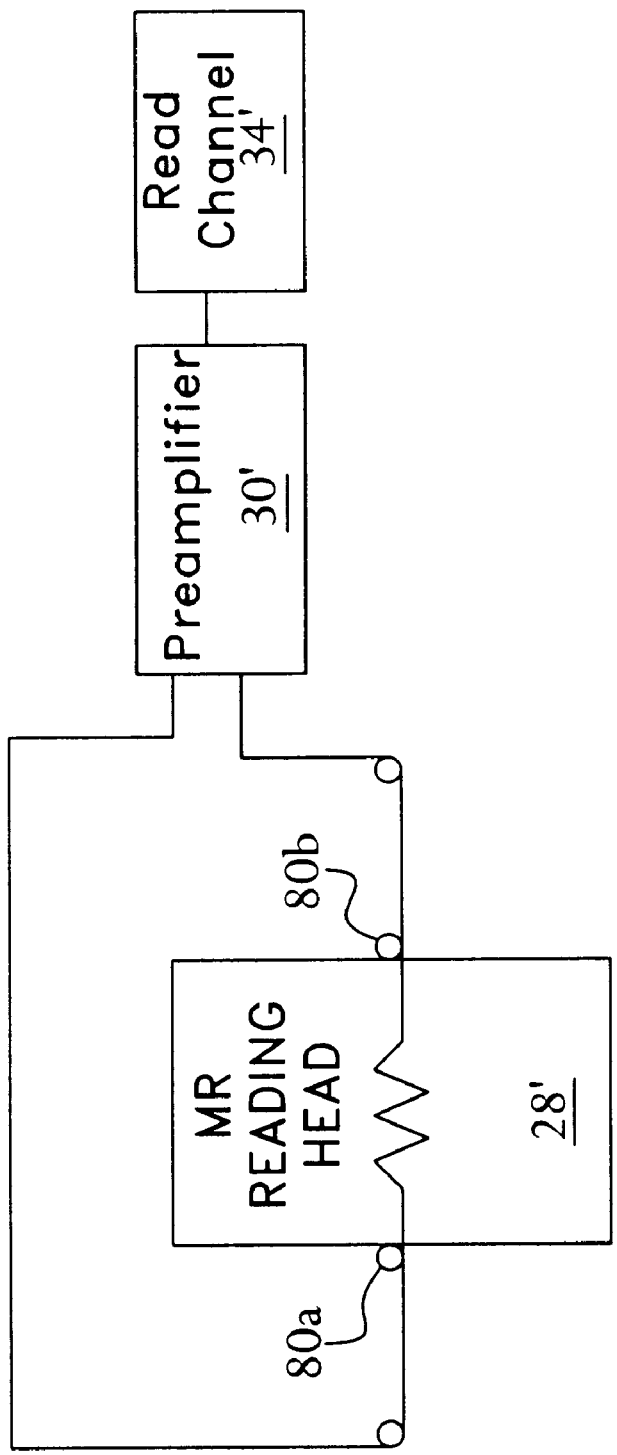
FIG. 8C (PRIOR ART) is a schematic block diagram of a conventional magneto-resistive head.
Figure 9:
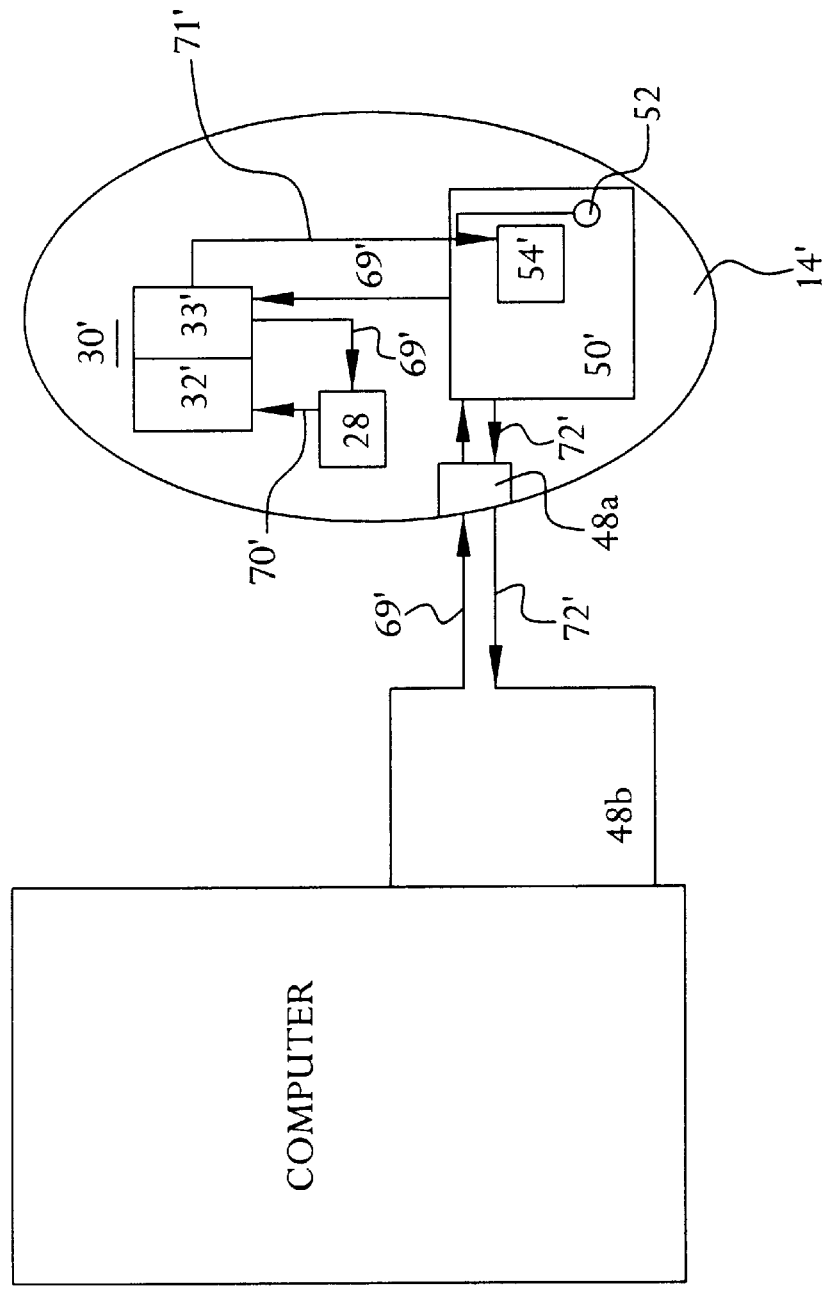
FIG. 9 (PRIOR ART) is a schematic block diagram of a conventional disk drive system.

The ESD charge quickly dissipates such that at 0.6 microseconds the voltage is back to close to zero. A voltage spike like that represented by curve 5 would likely catastrophically damage head 28 and other components, such as preamplifier 30 and recording channel 34. Voltage curve 5 is typical of an ESD event for a read head system shown in FIG. 8C.

Figure 5:
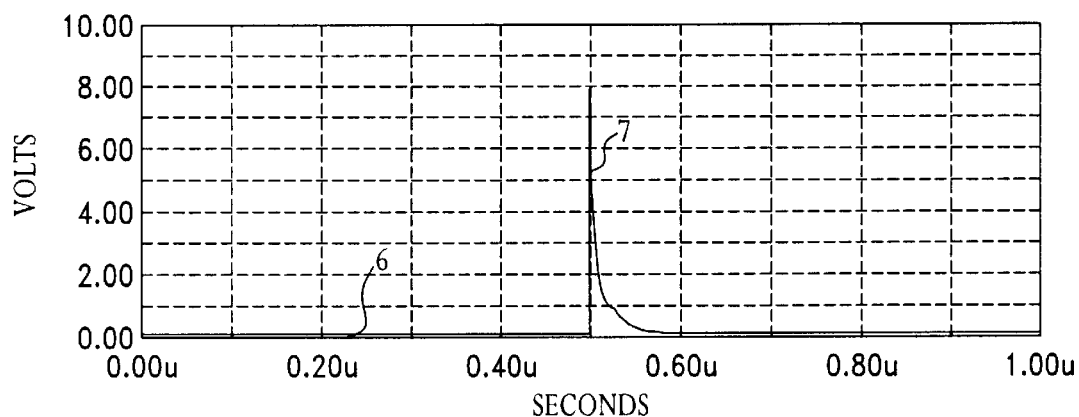
FIG. 5 is a diagram of a voltage versus time relationship for the exemplary magneto-resistive head undergoing an ESD event like that shown in FIG. 4. while employing the present invention.

Referring to FIG. 5 to illustrate a voltage-time relationship at head 28 in circumstances in which the drive employs the present invention in either embodiment 10a or 10b, signal 6 represents a normal reading process and may have a magnitude of a few millivolts. At 0.5 microseconds, an ESD event occurs, which is represented by curve 7. If the electrostatic discharge occurs on the side of terminal 80a, ESD protection network 11a conducts the ESD charge to network ground 82a. If the electrostatic discharge occurs on the side of terminal 80b, ESD protection network 11b conducts the ESD charge to network ground 82b for embodiment 10a. Alternatively, for embodiment 10b, the ESD charge on the side of terminal 80b dissipates through ground 83.

As shown in FIG. 5, the magnitude of the voltage spike at head 28 is approximately only 8 volts because the ESD protection networks 11a and/or 11b permit the ESD charge to dissipate through the respective network. Therefore, the voltage is maintained below the 50 volts or 15 volts that MR and GMR heads, respectively, may typically tolerate.

Simulation Results

Figure 10:
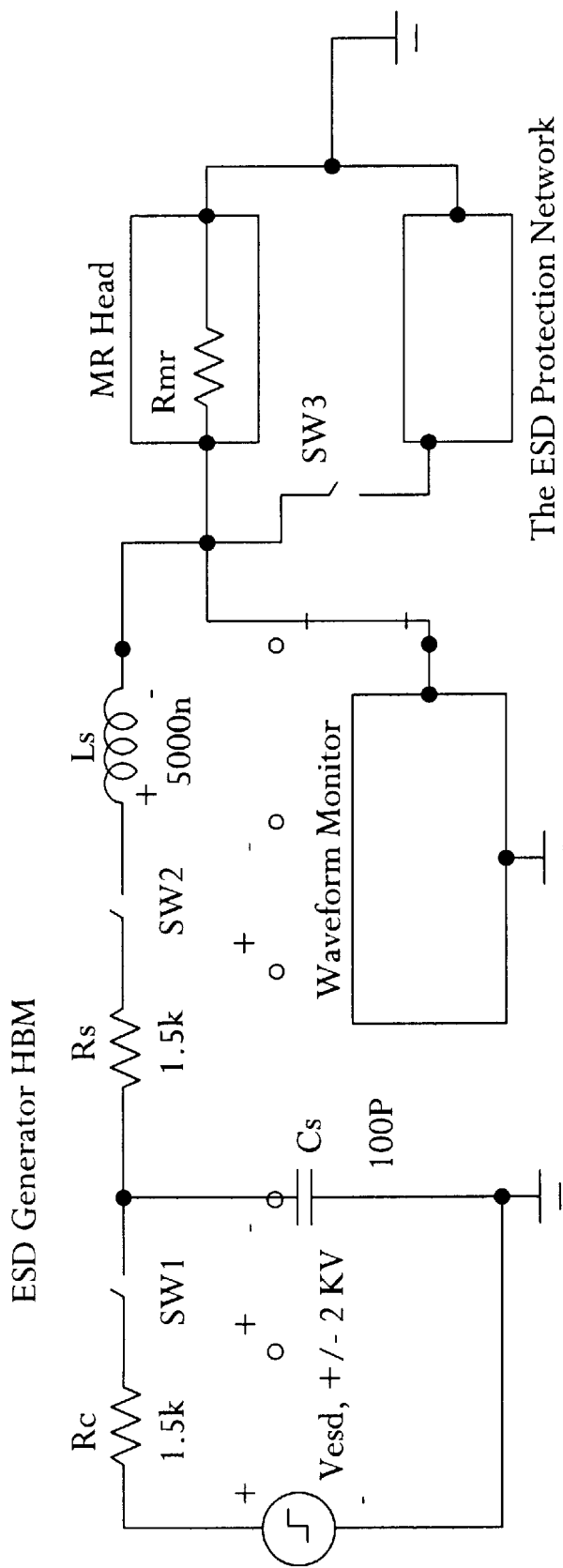
FIG. 10 is a schematic block diagram of a simulation set-up.

A Human Body Model (HBM) was employed as the ESD source to perform simulation tests on the ESD protection network of the present invention. Both +2000 and −2000 volts (that is, positive and negative voltages) were applied to simulate the extremely high voltage of ESD events. Simulation was performed to both AMR and GMR heads under the cases of with and without an ESD protection network attached to the heads. FIG. 10 illustrates the simulation schematic diagram, where V(esd) is electrostatic discharge voltage.

Figure 11A:
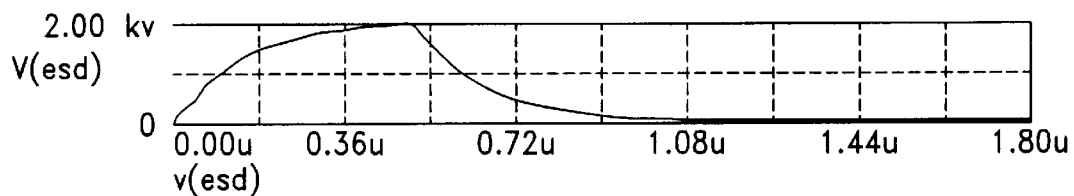
FIGS. 11A, 11B, and 11C respectively illustrate simulation results without the ESD protection network installed for an AMR head.
Figure 11B:
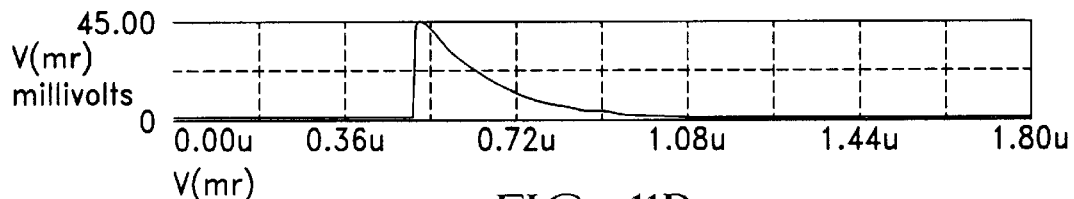
Figure 11C:
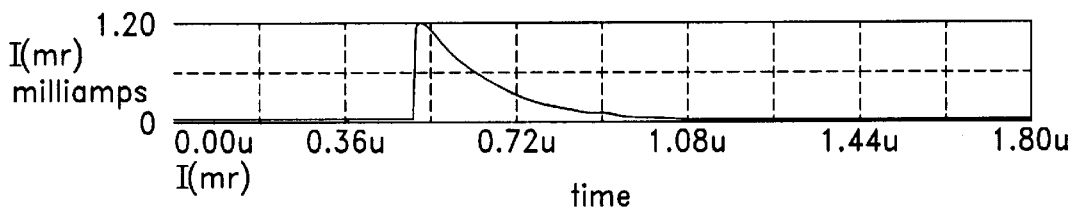
Figure 12A:
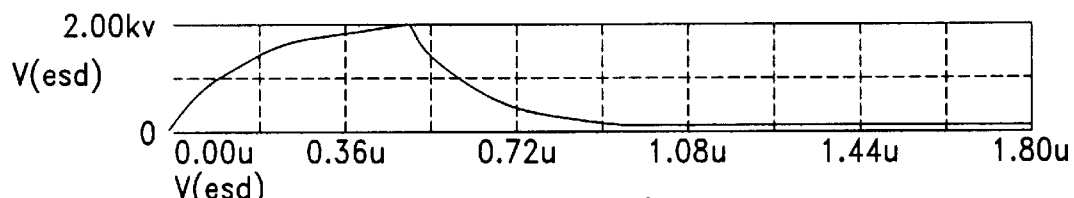
Figure 12B:
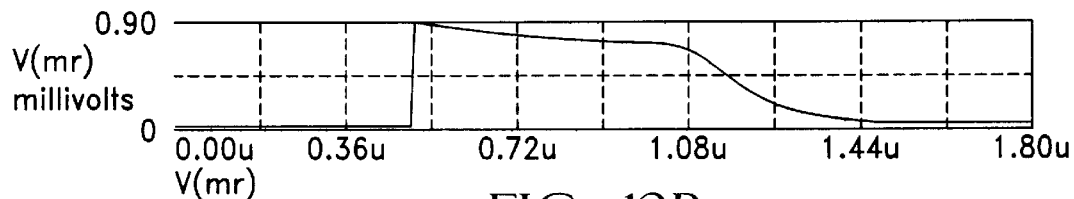
Figure 12C:
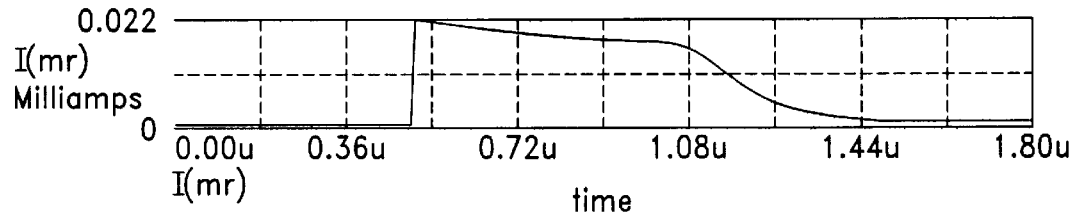

FIGS. 11A–C and 12A–C illustrate a simulation employing an MR or AMR head having a magneto-resistive strip having a resistance of 40 ohms. FIGS. 11A, 11B, and 11C respectively illustrate the ESD event voltage, the MR head voltage, and the MR head current without the ESD protection network installed. Figures respectively 12A, 12B, and 12C illustrate the ESD event voltage, the MR head voltage, and the MR head current with the ESD protection network installed to protect the head. FIGS. 13A–C and 14A–C illustrate a simulation employing a GMR head having a magneto-resistive strip having a resistance of 60 ohms. FIGS. 13A, 13B, and 13C respectively illustrate the ESD event voltage, the GMR head voltage, and the GMR head current without the ESD protection network installed. FIGS. 14A, 14B, and 14C respectively illustrate the ESD event voltage, the GMR head voltage, and the GMR head current with the ESD protection network installed to protect the head. Only the simulation results of the test employing the positive ESD voltage is shown in the Figures for brevity because the results of the tests employing the negative ESD voltage produce the same waveforms as those shown in the Figures.

Table 1 below summarizes the simulation results shown in the Figures. The results and other portions of the disclosure illustrate the effectiveness of the ESD protection network. The protect ration is calculated by dividing the value measured with the ESD protection by the value measured without the ESD protection. V(mr) is voltage across the MR head, and I(mr) is current flowing through the MR head. The benefit of the present invention is apparent from these results and from other portions of the disclosure. Other benefits and uses for the present invention will be apparent to persons familiar with the technology in light of the present disclosure.

TABLE 1

|  |  |  | V(ESD) +2kV | V(ESD) +2kV | Protect Ratio |
|---|---|---|---|---|---|
| AMR Head | V(mr) millivolts | W/O ESD P.N. With ESD P.N. | 45 0.9 | −45 −0.9 | 50 |
|  | I(mr) milliamps | W/O ESD P.N. With ESD P.N. | 1.2 0.022 | −1.2 −0.022 | 55 |
| GMR Head | V(mr) millivolts | W/O ESD P.N. With ESD P.N. | 70 0.9 | −70 −0.9 | 78 |
|  | I(mr) milliamps | W/O ESD P.N. With ESD P.N. | 1.2 0.015 | −1.2 −0.015 | 80 |

The system and method of the present invention are described herein with a respect to specific embodiments. However, the present invention encompasses other embodiments according to the broad invention concepts described herein. For example, the present invention has been described with respect to a disk 18, of a removable cartridge 16, although the present invention may be applied using magnetic tape or magnetic media. Further, the invention encompasses employing rotary or linear actuators, internal or external drives fixed or removable media drives, and similar variants. Although the ESD protection networks are particularly to GMR heads because of their inability to tolerate large voltages (as described above), the invention is equally applicable to other head types, including MR heads (described above), inductive heads, and other conventional heads.

What is claimed:

1. A head system for a data storage drive comprising:
   a read transducer, electrically coupled to recording channel components, having a grounded terminal and an ungrounded terminal; and
   an electrostatic discharge protect system including an electrostatic discharge protect network and a network ground, the network ground electrically coupled to the ungrounded terminal through the electrostatic discharge protect network, the protect network being non-conductive between the network ground and the ungrounded terminal below a predetermined voltage and being conductive between the network ground and the ungrounded terminal below a predetermined voltage;
   whereby the electrostatic discharge protect network changes from non-conductive to conductive upon an electrostatic discharge event to conduct an electrostatic charge to the network ground.

2. The head system of claim 1 wherein the electrostatic discharge protect system includes an array of junction field effect transistors.

3. The head system of claim 2 wherein the array includes plural N channel junction field effect transistors and P-channel field effect transistors.

4. The head system of claim 2 wherein the array includes a first row of plural N channel junction field effect transistors connected in series and a second row of plural P channel junction field effect transistors, each one of the first row and the second row connected between the read transducer and the network ground.

5. The head system of claim 4 wherein the first row and the second row are connected in parallel.

6. The head system of claim 1 wherein the read transducer comprises a magneto-resistive material.

7. A head system for a data storage drive comprising:
   a read transducer, electrically coupled to recording channel components, having a first ungrounded terminal and a ungrounded second terminal;

a first electrostatic discharge protect system including a first electrostatic discharge protect network and a first network ground, the first network ground electrically coupled to the first terminal through the first electrostatic discharge protect network, the first protect network being non-conductive between the first network ground and the first terminal below a predetermined voltage and being conductive between the first network ground and the first terminal below the predetermined voltage;

a second electrostatic discharge protect system including a second electrostatic discharge protect network and a second network ground, the second network ground electrically coupled to the second terminal through the second electrostatic discharge protect network, the second protect network being non-conductive between the second network ground and the second terminal below the predetermined voltage and being conductive between the second network ground and the second terminal below the predetermined voltage;

whereby the electrostatic discharge protect networks change from non-conductive to conductive upon an electrostatic discharge event to conduct an electrostatic charge to the network ground.

8. The head system of claim 7 wherein each one of the first electrostatic discharge protect system and the second electrostatic discharge protect system includes an array of junction field effect transistors.

9. The head system of claim 8 wherein each one of the arrays include plural N-channel junction field effect transistors and P channel field effect transistors.

10. The head system of claim 9 wherein each one of the arrays include a first row of plural N channel junction field effect transistors connected in series and a second row of plural P channel junction field effect transistors, each one of the first row and the second row connected between the read transducer and the network ground.

11. The head system of claim 9 wherein the first row and the second row are connected in parallel.

12. The head system of claim 7 wherein the read transducer comprises a magneto-resistive material.

13. An electrostatic protection network for a disk drive having a magneto-resistive read element, the network comprising:

a ground; and an array that blocks a signal current flow between the read element and the ground while a signal voltage is below a predetermined value and conducts the signal current from the read element to the ground while the signal voltage is above the predetermined value, whereby electrostatic discharge events are dissipated through the network to diminish damage to the read element.

14. The electrostatic protection network of claim 13 wherein the array includes plural junction field effect transistors.

15. The electrostatic protection network of claim 13 wherein the array includes plural N-channel junction field effect transistors and P-channel field effect transistors.

16. The electrostatic protection network of claim 13 wherein the array includes a first row of plural—channel junction field effect transistors connected in series and a second row of plural P-channel junction field effect transistors connected in series, each one of the first row and the second row connected between the read transducer and the network ground.

17. The electrostatic protection network of claim 16 wherein the first row and the second row are connected in parallel.

* * * * *